United States Patent [19]

Midland

[11] Patent Number: 4,628,349
[45] Date of Patent: Dec. 9, 1986

[54] VIDEO-INDEX SIGNAL MIXER

[75] Inventor: Richard W. Midland, Inverness, Ill.

[73] Assignee: Zenith Electronics Corporation, Glenview, Ill.

[21] Appl. No.: 721,721

[22] Filed: Apr. 9, 1985

[51] Int. Cl.$^4$ .......................... H04N 9/24; H04N 9/22
[52] U.S. Cl. .......................................... 358/67; 358/66
[58] Field of Search ........................ 358/66, 67, 69, 70

[56] References Cited

U.S. PATENT DOCUMENTS

| | | | |
|---|---|---|---|
| 4,408,223 | 10/1983 | Midland | 358/67 |
| 4,468,690 | 8/1984 | Midland | 358/67 |
| 4,527,192 | 7/1985 | Midland et al. | 358/67 |

FOREIGN PATENT DOCUMENTS 0074281  6/1980  Japan ..................................... 358/67

*Primary Examiner*—James J. Groody
*Assistant Examiner*—Cynthia Smith

[57] ABSTRACT

A wide-band video amplifier-index signal mixer for driving a beam index CRT includes a low power, high speed "off-the-shelf" video switching transistor having two inputs, one supplied by a first low power, high speed switching transistor coupled to receive video signals and another supplied by a second low power, high speed switching transistor coupled to receive index video signals. Both signals are in digital form. A video gate supplies the first transistor and an index gate supplies the second transistor. Another pair of gates are connected to also supply the video signal to the index gate. Thus, during occurrence of a video signal, both the video gate and the index gate are enabled and both inputs of the video switching transistor are activated.

6 Claims, 2 Drawing Figures

VIDEO-INDEX SIGNAL MIXER

BACKGROUND OF THE INVENTION AND PRIOR ART

This invention relates generally to a beam index signal processing system and, particularly, to a low cost, wide-band beam index video-index signal system.

Interest in so-called beam index color television cathode ray tubes (CRTs) has accompanied the rise in popularity of computer video terminals, particularly video terminals requiring high resolution color displays. In that environment, the high resolution capability of the beam index CRT affords obvious advantages over conventional color CRTs, even those of the high resolution type. Further, the information on the computer video terminal is generally in a form that is adaptable to digital control and readout. Usually the CRT display is driven by a character generator, under control of a microprocessor, for displaying a number of characters or pixels of information and the sharpness and resolution of the video display is of great importance. As will be shown, in a wide-band index tube system, the position of the single beam is at all times known with precision and thus the beam index CRT may advantageously be used as a high resolution color monitor.

Beam index systems may be generally categorized as narrow-band and wide-band. The more common narrow-band system operates on the basis that the beam scanning frequency is fixed throughout a scan line with minor adjustments in phase being made during the scanning of the line. A narrow-band system has the advantage of noise immunity and can therefore operate with very low index strip excitation. A disadvantage is that all but very minor variations in space between index strips are generally not compensatable and can result in color impurity. A wide-band index system operates on the basis that the scanning is done on a strip-by-strip basis which automatically compensates for variations in periodicity of the index strips. Examples of a wide-band index system are U.S. Pat. Nos. 4,408,223 and 4,468,690. The wide-band system affords very close control over the beam and enables improved efficiency because of the precision with which the beam position is known. A disadvantage is that the wide frequency band renders the system susceptible to noise and the excitation level of the index strip must be much greater to produce an acceptable signal-to-noise ratio. The high index strip excitation adversely impacts the no video "blackness" of the tube and the contrast of the display. As described in the above patents, techniques are available for preserving these characteristics by turning off the beam current between the index strips, in the absence of video information.

A wide band index signal system must therefore be designed to operate with the relatively high beam current required to reliably "find" the index strips (the index video signal) and to drive the CRT sufficiently to produce a bright video display. Inevitable compromises occur since fast switching transistors of high current capacity are very expensive. In the prior art patents, mixing of the video and the index video signals is done before the video amplifier which imposes the requirements of a transistor video amplifier that is both powerful and linear. There requirements significantly add to the system cost. With the invention, the digital video and index video signals are supplied to a video-index signal mixer that operates primarily as a switch with the result that relatively low power, low cost "off-the-shelf" switch transistors may be used. The resultant circuit is not only cost effective, it exhibits improved operating characteristics.

OBJECTS OF THE INVENTION

Accordingly, a principal object of the invention is to provide a novel video-index signal mixer for a wide-band beam index system.

Another object of the invention is to provide a high efficiency video amplifier for a wide band beam index system.

A further object of the invention is to provide a low cost video-index signal mixer of high efficiency for a wide-band beam index system.

BRIEF DESCRIPTION OF THE DRAWINGS

Further objects and advantages of the invention will be apparent from reading the following description in conjunction with the drawings in which.

DESCRIPTION OF THE PREFERRED EMBODIMENT

Conventionally, a beam index CRT viewing screen consists of a pattern of groups of red, blue and green light-emitting phosphor stripes, each stripe being separated from the adjacent stripe by a guard band consisting of a stripe of black inert material. The phosphor screen is covered with a thin layer of reflective aluminum for enhancing the light output from the CRT and for making the phosphor screen conductive. The guard band stripes between the blue and red light-emitting phosphor stripes bear index strips that overlie the aluminum layer. The index strips are generally made of another electron beam-activated phosphor material, the light output therefrom not affecting the display due to the presence of the aluminum layer. Photons emitted from the index strips as a result of electron bombardment are detected by a photo-multiplier tube (PMT) or solid state light detector positioned adjacent to the rear of the CRT and suitable circuitry converts the PMT output into an index signal. This technique is well known in the art and will not be described in detail.

Figure 1:
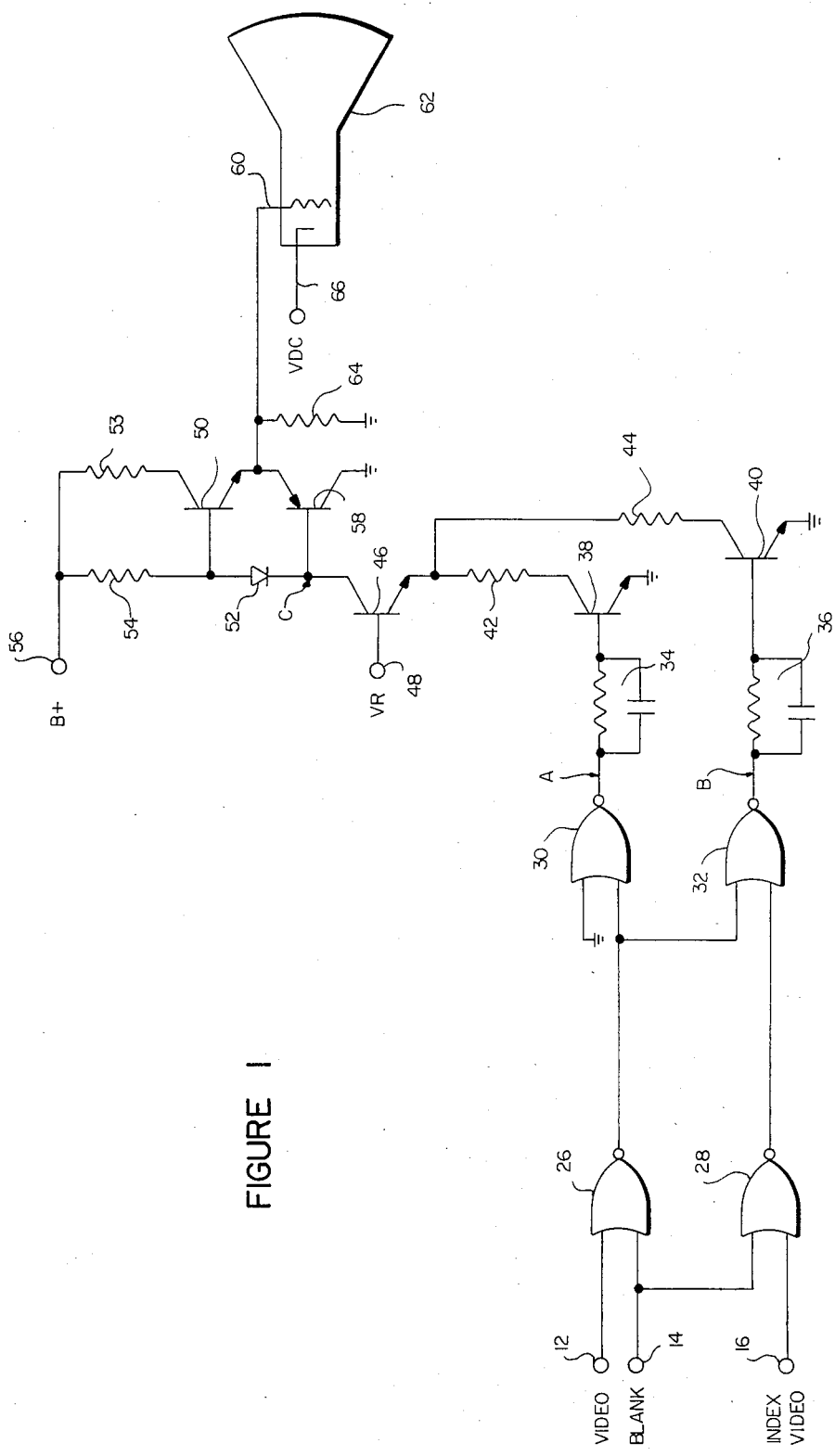
FIG. 1 represents a partial schematic diagram of a wide-band video-index signal mixer constructed in accordance with the invention.

Referring to FIG. 1, a digital signal input circuit includes three input terminals 12, 14 and 16 for receiving video information, blanking signal information and index video information, respectively. The video information may be supplied from the output of a microprocessor controlled character generator or from a memory, the blanking information is derived from conventional horizontal and vertical blanking signals and the index video is an index signal that indicates when the CRT electron beam is in position to strike an index strip. Video input terminal 12 is connected to one input of a NOR gate 26, blanking input terminal 14 is connected to the other input of NOR 26 and to one input of a NOR gate 28 and index video input terminal 16 is connected to the other input of NOR 28. The control of the video, index video and blanking signals is performed by suitable computer means (not shown). The output of NOR 26 is connected to one input of a video NOR gate 30 and to one input of an index video NOR gate 32. The output of NOR 28 is connected to the other input of NOR 32 and the other input of NOR 30 is connected to ground. The outputs of NORs 30 and 32 are connected, respectively, through peaking networks 34 and 36 to the base inputs of a pair of switching transistors 38 and 40. The emitters of transistors 38 and 40 are connected to ground and the collectors are connected through resistors 42 and 44, respectively, to the emitter of a video switching transistor 46, the base of which is connected to a terminal 48 supplied with a reference voltage VR. Transistors 38 and 40 are thus seen to be in a cascode connection with transistor 46. The collector of video switching transistor 46 is supplied from a B+ source at a terminal 56 through the series combination of a resistor 54 and a diode 52. A push-pull emitter-follower connection of transistors 50 and 58 is provided. A current limiting resistor resistor 53 is connected from terminal 56 to the collector of transistor 50. Diode 52 is connected across the bases of both transistors. The base of transistor 58 is connected to ground and the emitters of both transistors are connected together and to a control grid 60 of a CRT 62. Grid 60 is connected to ground through a resistor 64 and the cathode 66 of the CRT is coupled to a source of DC reference voltage VDC.

A well known fact about CRT operation is that better electron gun performance is obtained with increased drive potential on the control grid G1, which corresponds to grid 60 of FIG. 1. Thus the beam "spot size" is better, that is smaller, for increased drive voltages. In the wide-band beam index system of the invention, the CRT beam is either "ON", "OFF" or at a low level for index video. Consequently the inventive system utilizes a switching video amplifier-mixer rather than a linear system. The result is that very fast switching, but low power handling, off-the-shelf transistors are used, with the transistors being quickly driven from cut-off to saturation to minimize power dissipation. The relatively short interval during which the small index video signal alone is present results in acceptable power dissipation in the switching transistor. As will be seen, the amplifier-mixer arrangement wherein the video and index video drives are both used to quickly drive the switching transistor between its cutoff and saturation conditions provides an ideal solution.

Figure 2:
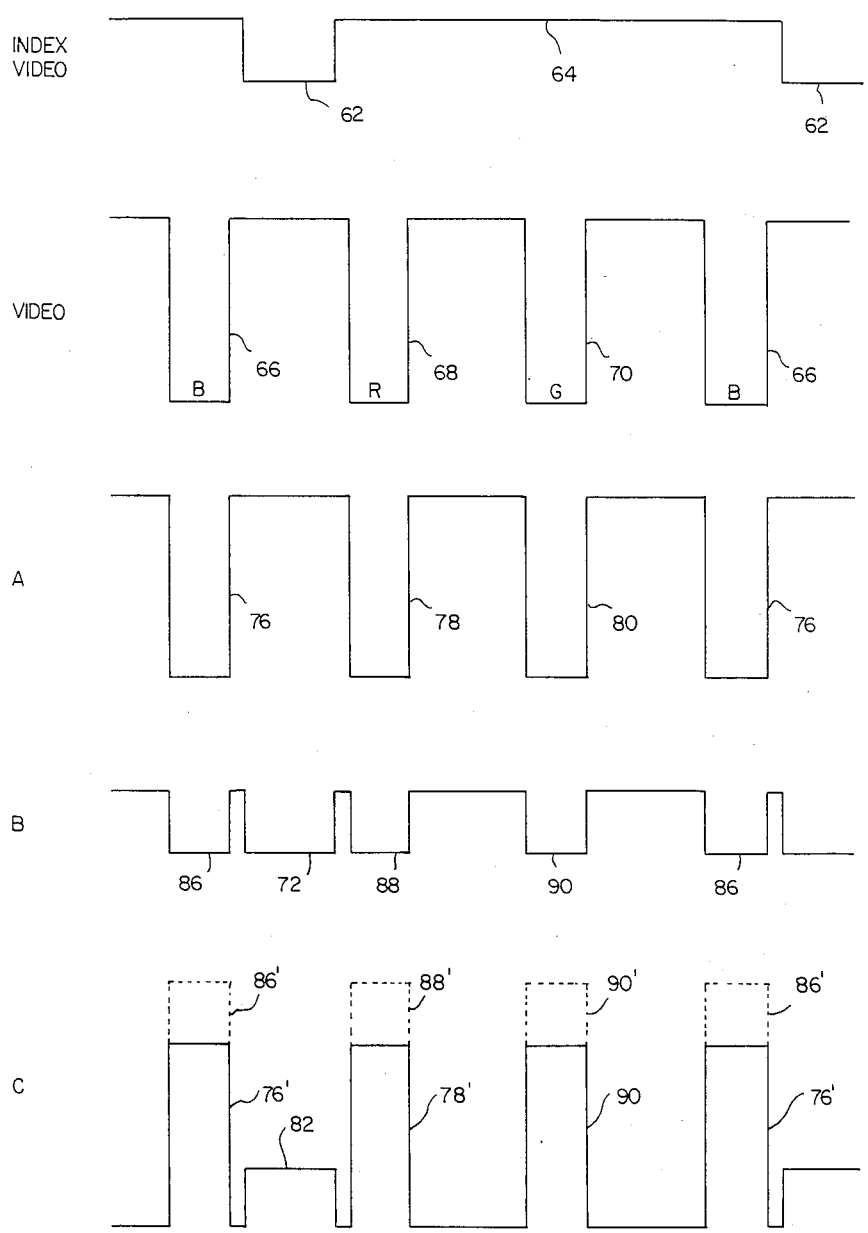
FIG. 2 represents a series of waveforms illustrating operation of the circuit of the invention.

The locations of points A, B and C on the circuit diagram should be noted when considering the waveforms in FIG. 2. The index video waveform consists of negative going TTL (transistor to transistor logic) pulses 62 corresponding to the electrical signal derived from the photons produced when the electron beam in the CRT strikes an index strip. The index signal is actually "one strip behind" because of processing time delay, but the variation from strip to strip is insignificant. The video signal waveform is seen to comprise a plurality of narrower pulses 66, 68 and 70 corresponding to blue, red and green video signals, respectively. The amplitude of these pulses is three to four times larger than the amplitude of the the index video signal, it being appreciated that the waveforms are not drawn to scale, but to illustrate the principle of the invention.

Waveform A is that which appears at junction A on FIG. 2, namely at the output of video NOR gate 30. It is substantially identical to the video signal waveform above with the pulses 76, 78 and 80 corresponding to pulses 66, 68 and 70, respectively. Waveform B similarly is that at the output of index video NOR gate 32 and is seen to be a combination of the video and index waveforms corresponding to pulses 66, 68 and 70 and pulses 62, respectively. Thus, the index video NOR is enabled in response to either video information or index video information. Waveform C is representative of the collector voltage of video switching transistor 46 and is a combination of waveforms A and B, but of opposite polarity. Pulses 76', 78' and 80' correspond to video pulses 76, 78 and 80, respectively, and pulses 86', 88' and 90' correspond to index video pulses 86, 88 and 90, respectively. The index video pulses are shown in dashed lines atop the video pulses and represent the decreased drive current developed for driving video switching transistor 46 out of saturation. Pulse 82 represents the low level index video drive supplied when the CRT beam is in position to strike an index strip. Thus the circuit functions as an additive mixer for the video and index video and as a high speed video amplifier.

The push-pull emitter-follower configuration of transistors 50 and 58 presents a low impedance source for driving the CRT capacitances, thus preserving the high frequency response of the system. When video switching transistor 46 is being driven into saturation, transistor 50 is cut off and transistor 58 is conductive whereas when video switching transistor 46 is being cut off, transistor 50 is driven conductive and transistor 58 is cut off.

What has been described is a novel video amplifier-index signal mixer for a wide-band beam index system. It is recognized that numerous modifications and changes in the described embodiment of the invention will be apparent to those skilled in the art without departing from its true spirit and scope. The invention is to be limited only as defined in the claims.

What is claimed is:

1. A video amplifier-index signal mixer for a wide-band beam index system including a CRT comprising:
   video switch means for controlling the amplitude of signal applied to said CRT, said video switch means having first and second inputs;
   video signal means enabled responsive to a video signal, coupled to the first of said inputs;
   index signal means, enabled responsive to an index signal, coupled to the second of said inputs;
   said video switch means being driven conductive by either said video signal means or said index signal means being enabled; and
   gate means interconnecting said video signal means and said index signal means for enabling said index signal means whenever said video signal means is enabled, whereby during occurrence of a video signal, both said inputs to said video switch means are enabled.

2. The circuit of claim 1 wherein said video switch means, said video signal means and said index signal means each include a low power, high speed switching transistor.

3. The circuit of claim 2 wherein said video signal means further include a video NOR gate driving said switching transistor in said video signal means, and wherein said index signal means further includes an index NOR gate driving said switching transistor in said index signal means.

4. The circuit of claim 3 wherein said gate means comprises a pair of additional NOR gates for receiving said video signal and said index video signal, one of said additional NOR gates associated with said video NOR gate and the other of said additional NOR gates associated with said index NOR gate.

5. In combination in a wide-band beam index system for driving a cathode ray tube with ON/OFF video information, and with ON/OFF index video information, the ON level of said index video information being significantly lower than the ON level of said video information, a video amplifier-index signal mixer comprising:

video transistor switching means having an output coupled for supplying said video information and said index video information to said CRT and two inputs;

a video input terminal for receiving digital video signals;

an index video input terminal for receiving digital index video signals;

gate means including a video gate and an index video gate coupled to said input terminals, respectively;

a first switching transistor coupled between said video gate and a first one of said inputs of said video transistor switching means and a second switching transistor coupled between said index video gate and a second one of said inputs of said video transistor switching means; and said gate means supplying said video signal to said index video gate for combining the effects of said video signal and said index video signal in said video signal switching means.

6. The combination of claim 5, wherein said gate means further include a pair of additional gates interposed between said input terminals and said video gate and said index video gate, respectively, with the output of the one of said pair of additional gates coupled to said video input terminal being connected to the inputs of both said video gate and said index video gate.

* * * * *